May 3, 1932.  J. C. FONTAINE  1,857,081
TRAILER
Filed Dec. 9, 1929   6 Sheets-Sheet 1

J. C. Fontaine, Inventor
By C. A. Snow & Co.
Attorneys.

May 3, 1932. J. C. FONTAINE 1,857,081
TRAILER
Filed Dec. 9, 1929 6 Sheets-Sheet 5

J. C. Fontaine, Inventor

By C. A. Snow & Co.
Attorneys.

May 3, 1932.  J. C. FONTAINE  1,857,081
TRAILER
Filed Dec. 9, 1929   6 Sheets-Sheet 6
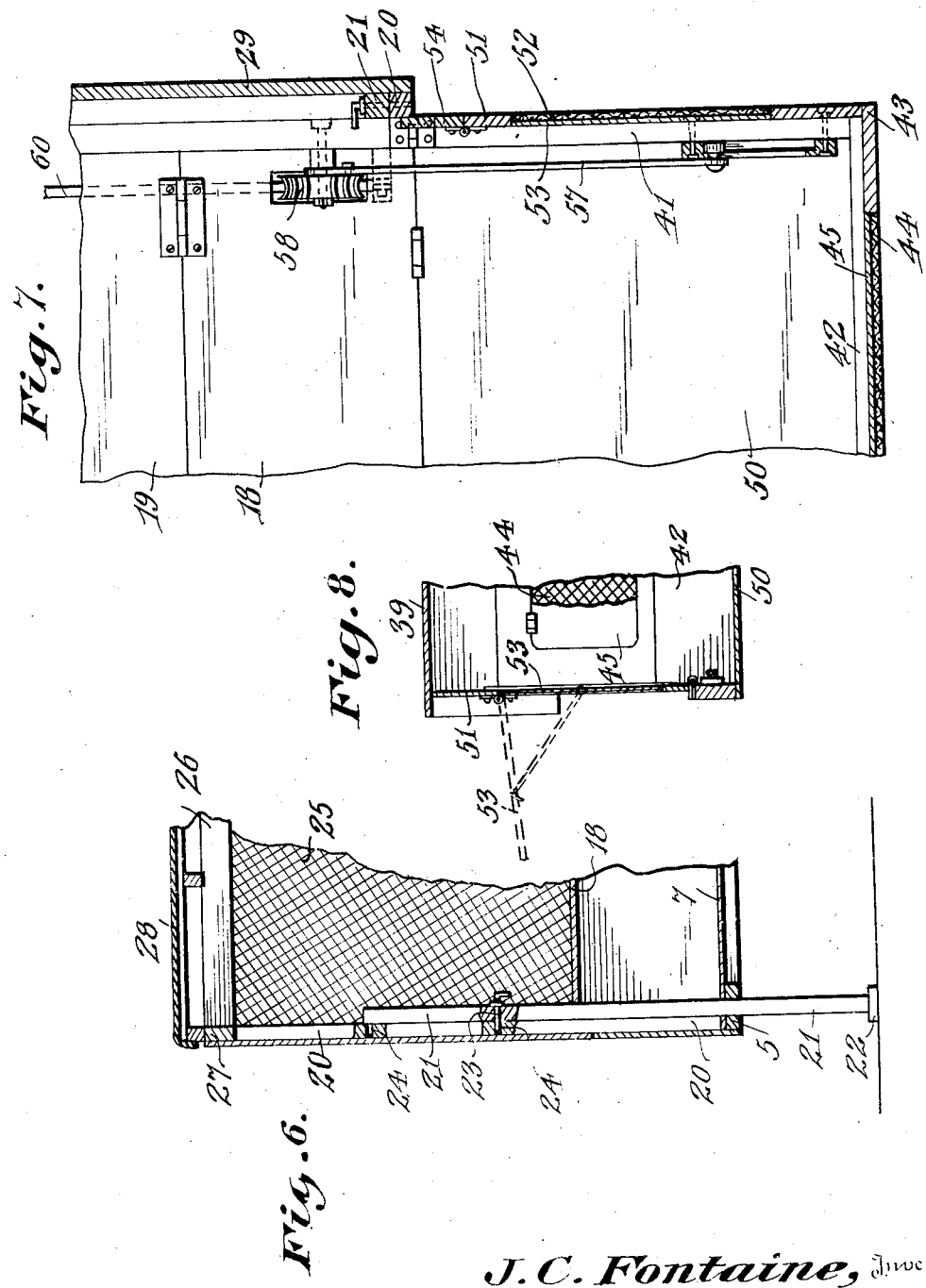
J. C. Fontaine, Inventor
By C. A. Snow & Co.
Attorneys.

Patented May 3, 1932

1,857,081

UNITED STATES PATENT OFFICE

JOHN CLELLAND FONTAINE, OF SHREVEPORT, LOUISIANA

TRAILER

Application filed December 9, 1929. Serial No. 412,844.

This invention relates to trailers designed primarily for use as sleeping quarters for campers.

It is an object of the invention to provide a compact wheel-supported structure having two foldable beds so constructed and arranged that, by unfolding them, the side panels of the trailer will be swung laterally and upwardly to form roof extensions and, at the same time, supplemental panels will be brought into position to form walls for the extensions.

Another object is to provide a trailer having ample storage space located where it will not hamper the occupants.

A further object is to provide a trailer having windows at the ends thereof whereby the driver of the machine towing the trailer can see traffic in the rear thereof.

A still further object is to provide a portion of each bed with a foldable structure which serves to reinforce the bed while extended for use.

Another object is to provide mechanism by means of which the beds and the parts connected thereto can be actuated at will.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings, the preferred form of the invention has been shown.

In said drawings.

Figure 2:
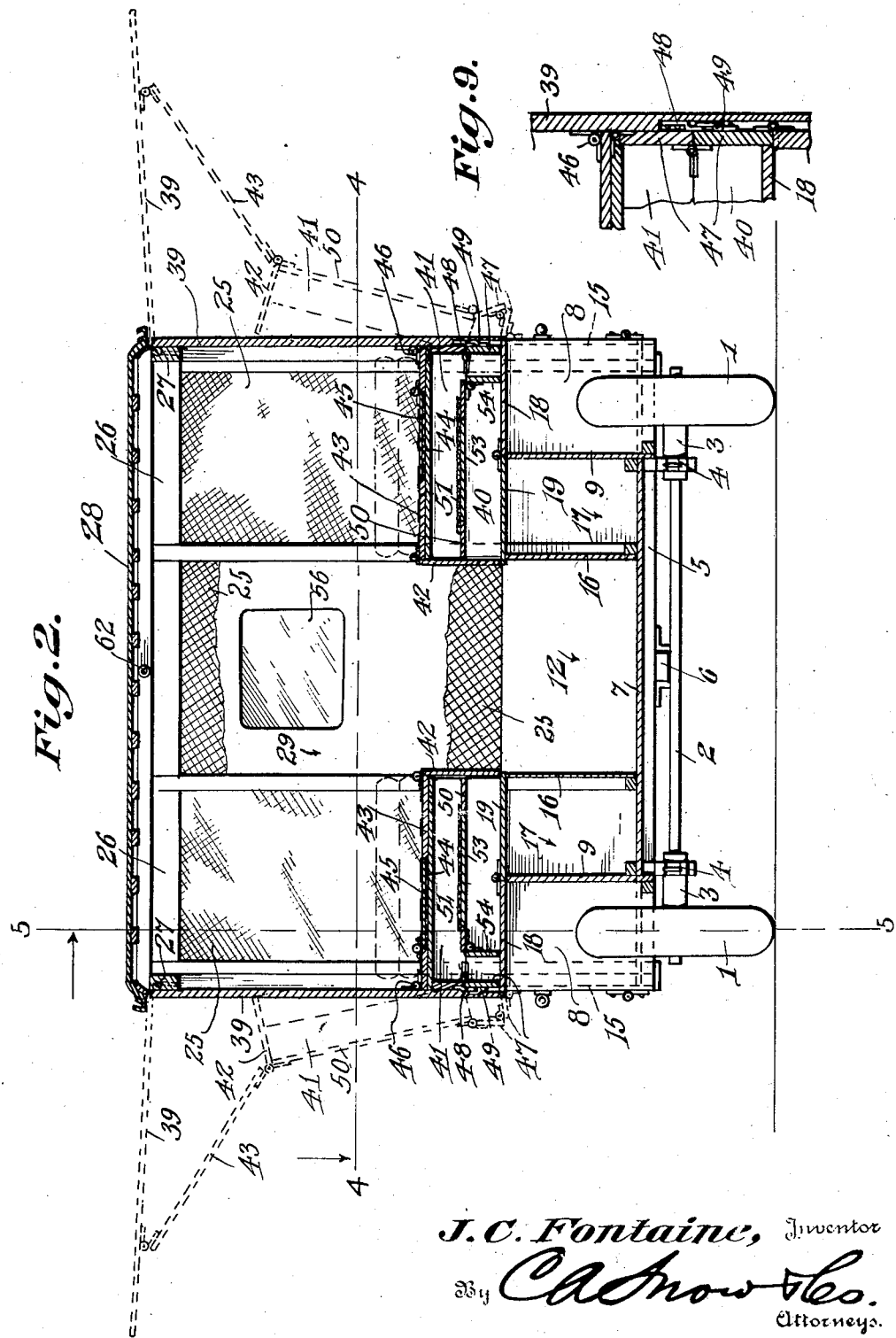
Figure 2 is a section on line 2—2, Figure 1, an intermediate position of each of the beds and the side panel connected thereto being indicated by broken lines.
Figure 4:
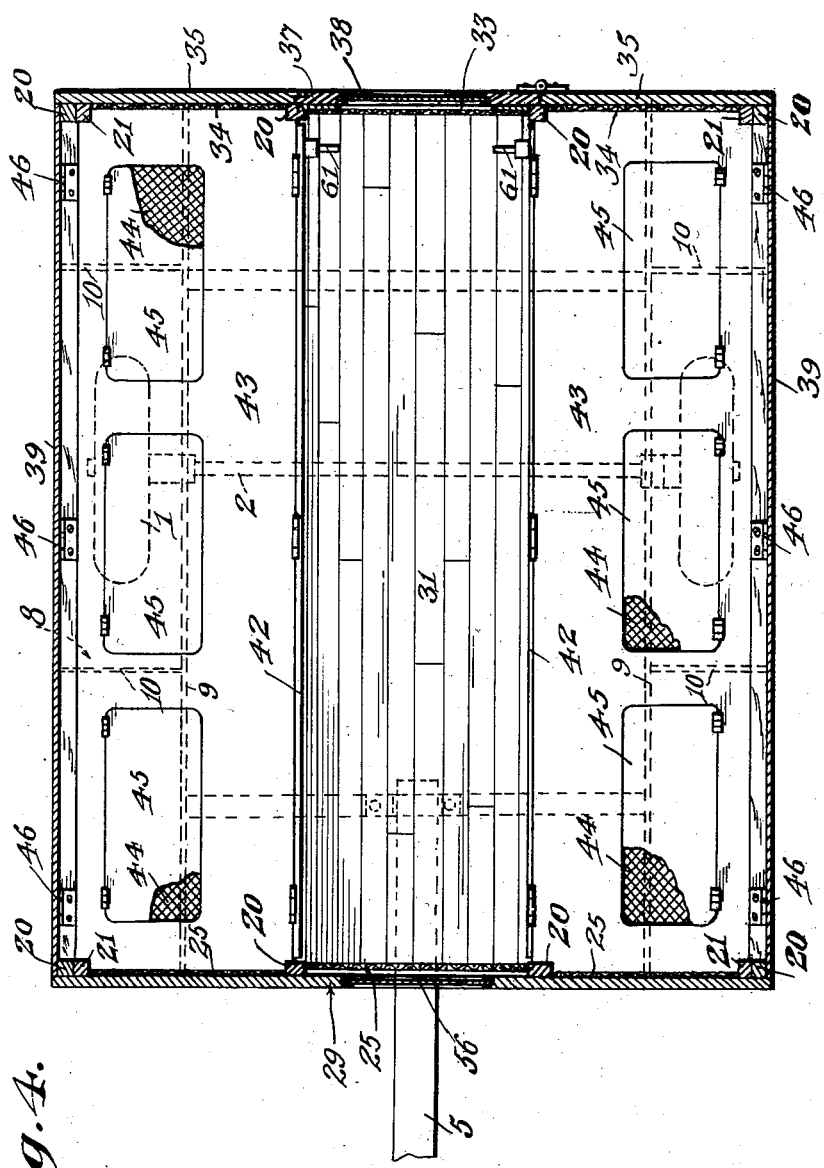
Figure 5:
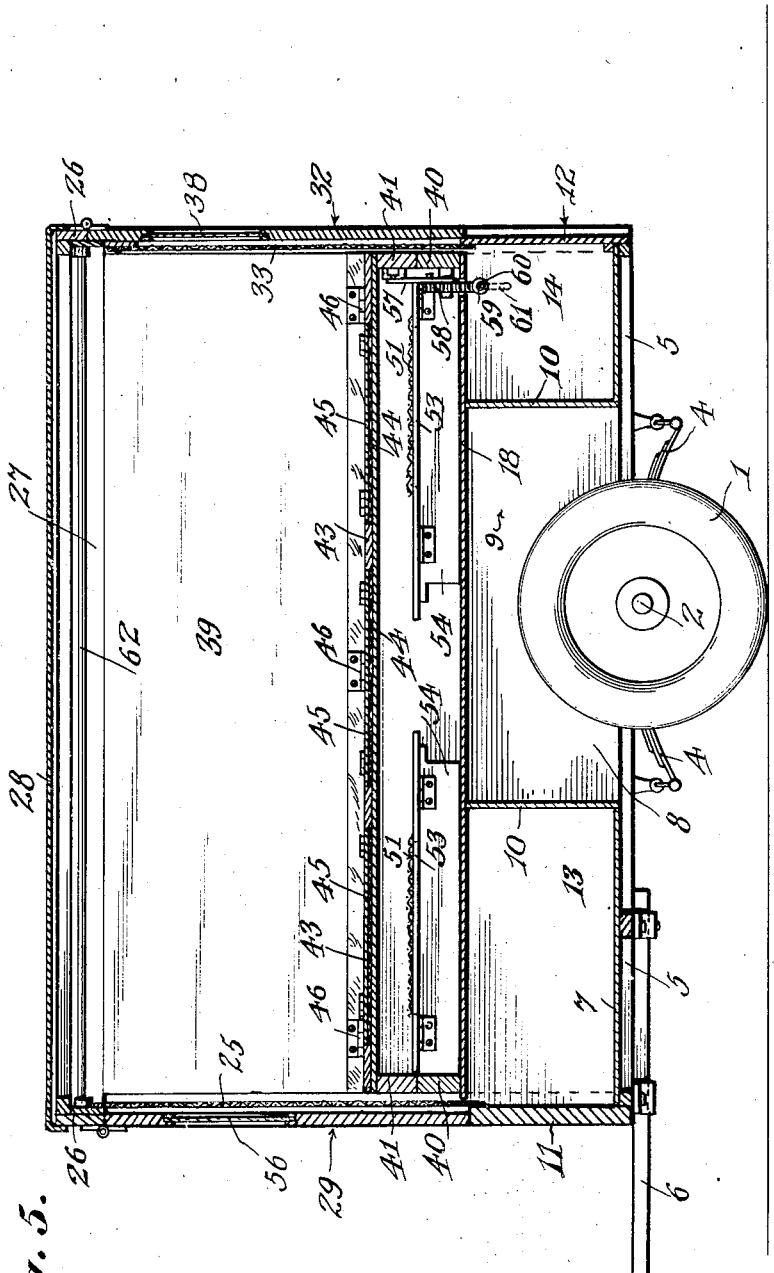

Figure 4 is a section on line 4—4, Figure 2.
Figure 5 is a section on line 5—5, Figure 2.
Figure 6 is a view partly in section and partly in elevation showing in detail one of the legs and adjacent parts.

Figure 3:
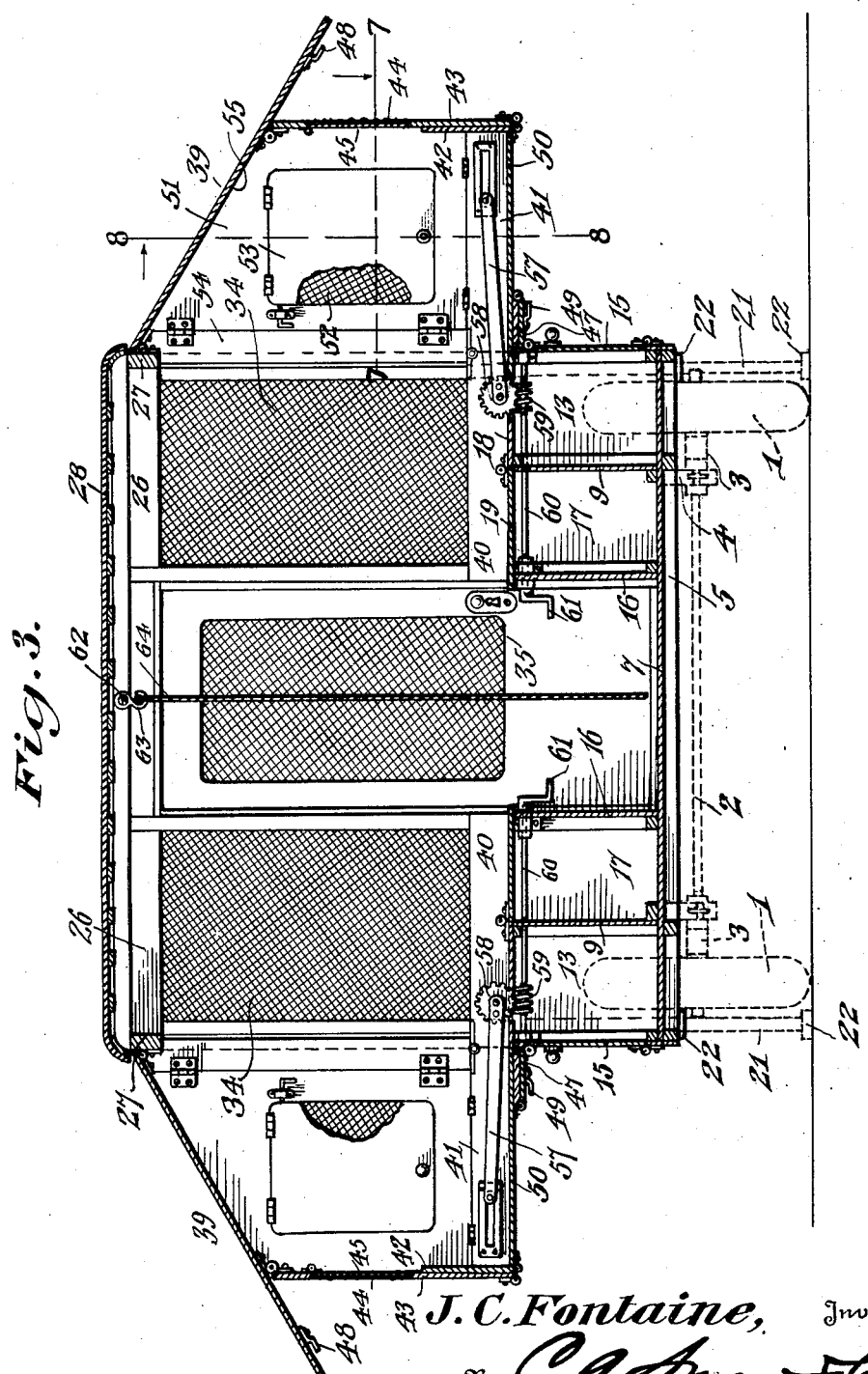
Figure 3 is a section on line 3—3, Figure 1, the beds and the side panels being shown fully extended for use.

Figure 7 is a horizontal section through a portion of the structure taken on line 7—7, Figure 3.

Figure 8 is a section through a portion of the structure taken on line 8—8, Figure 3.

Figure 9 is an enlarged vertical section through the outer side portion of the folded bed and adjacent parts.

Referring to the figures by characters of reference, 1 designates supporting wheels carrying an axle 2 which, in turn, is extended through bearings 3 carried by springs 4. These springs are attached to the bottom frame 5 of the trailer. A draft tongue 6 is secured to and extends forwardly from frame 5. The frame 5 supports a floor 7 cut away at the sides to provide clearances for the wheels 1 these clearances being indicated at 8. Longitudinal partitions extend throughout the length of the floor as shown at 9 and are disposed along the inner walls of the clearances 8. The front and back walls of the clearances are formed into partitions 10 and these cooperate with partitions 9 and with the low end walls 11 and 12 of the trailer to form cupboards 13 and 14 each of which has an outside door 15 adapted to swing outwardly and downwardly to afford access to the cupboard. These doors, when closed, are suitably sealed against the intrusion of dust and moisture.

Additional longitudinal partitions 16 are mounted on the floor 7 and spaced inwardly from the partitions 9 so as to provide additional storage spaces indicated at 17. The cupboards 13 and 14 and the clearances 8 are closed at the top by a panel 18 fixedly mounted on the partitions 9 and 10 and extending lengthwise of the structure. These panels are fixed. The tops of the storage spaces 17 are closed by hinged lids 19 extending throughout the length of the said spaces and normally resting on the partitions 9 and 16.

As before stated, the trailer is provided with end walls 11 and 12. The front end wall 11 is extended throughout the width of the trailer structure and extends the same height as the partitions 10, 9, and 16. Corner and intermediate posts 20 are secured to and extend upwardly from the frame 5 and slidably mounted on the corner posts and within the panels 18 are legs 21 having feet 22 adapted to be lowered into contact with the ground so that when the tongue 6 is left unsupported by an automobile, the trailer will remain level and can be used for camping purposes. The legs can be held in either raised or lowered positions by pins 23. Each pin is carried by one of the legs and is insertable into one of a pair of recesses 24. By inserting the pin into the lower recess as shown in Figure 6 the leg will be held extended downwardly. By extending the pin into the upper recess 24 the leg will be supported in raised position.

The corner and intermediate posts at the front end of the trailer structure have screens fitted snugly between them as shown at 25 and the upper ends of these posts as well as the corresponding posts at the back of the trailer are connected by cross strips 26 which, in turn, are connected at their ends by upper side strips 27. The roof 28 of the trailer is mounted on the strips 26 and 27 and can be of any desired construction, it being preferably like those ordinarily provided for closed automobiles.

To the front cross strip 26 is hingedly connected a front closure panel 29 which, when in lowered position, fits snugly against the top of the front wall 11 and extends throughout the width of the trailer so as to completely close the screened end thereof. By means of brace rods 30 or the like this panel can be supported in a raised position at which time it will be extended downwardly and forwardly so as to constitute a roof extension.

The rear wall 12 of the trailer does not extend continuously throughout the width of the structure. Instead it is cut away at the center so as to leave a space between the intermediate post 20 approximately equal to the width of the aisle 31 between the partitions 16. Extending into this space is the lower portion of a rear door 32 having a screened opening 33. The spaces between the intermediate posts and the corner posts 20 at the back of the trailer are provided with screens 34 similar to those located at the front end of the trailer.

Figure 1:
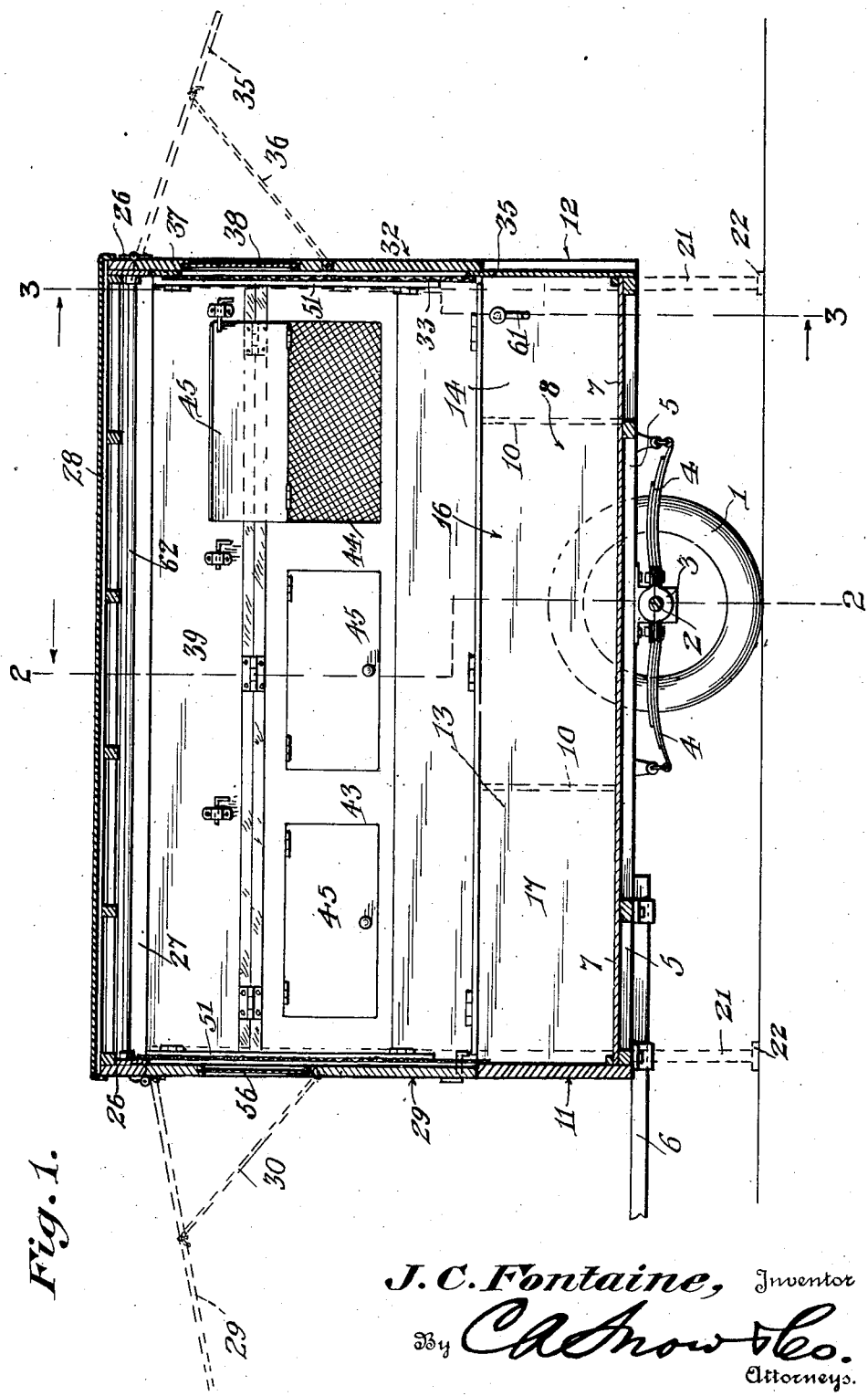
Figure 1 is a central vertical longitudinal section through the trailer, the positions of some of the parts when extended being indicated by broken lines.

A closure panel 35 is hingedly connected to the rear cross strip 26 and is adapted to swing rearwardly and upwardly to open position. This panel, when closed, extends entirely across the screens 34 and the door 32. When desired, however, the panels 35 can be swung upwardly to an inclined position as shown by broken lines in Figure 1 at which time it can be supported by braces such as rods 36 or the like provided for that purpose.

The rear panel 35 terminates at its upper edge close to the wall 12 but it is provided with a supplemental door 37 having a window 38. This door is so proportioned that it can be swung outwardly to open position and allow the inner door 32 to swing outwardly to open position. Thus even though the rear closure panel 35 is in closed position, it is possible to enter and leave the trailer by opening the two doors 32 and 37. Door 37 is so mounted that when the closure panel 35 is in elevated position as shown by broken lines in Figure 1, the door will be held flush with the panel by the stop strips provided therefor.

Hingedly connected to each of the upper side strips 27 is a side panel 39. This panel extends to the outer edge of the top panel 18 and constitutes a closure for the side of the trailer under normal conditions as shown by full lines in Figure 2. Secured on the end portions of each top panel 18 where the cover 19 can swing upwardly between them are the end strips 40 of a bed section. To the outer ends of these strips are hingedly connected the ends of a movable bed section 41 having an apron 42 secured along one side thereof and adapted to conceal both bed sections when they are folded one upon the other as shown in Figure 2.

To the inner longitudinal edge of the upper portion of section 41, when folded, is hingedly connected a panel 43 having screened window openings 44 which can be closed by hinged shutters 45. Normally this panel with its window shutters rests flat upon the upper one of the folded bed sections as shown in Figure 2. The outer edge portion of the panel 43 is hingedly connected at 46 to an intermediate portion of the side panel 39.

The folded bed sections do not extend close to the lower portion of panel 39 but are spaced therefrom a sufficient distance to receive hingedly connected reinforcing strips 47, the lower strip being hingedly connected at its lower edge to the outer edge portion of the top panel 18 while the upper edge of the upper strip 47 is hingedly connected to the upper portion of the outer side of the top bed section 41. In this connection attention is directed to Figure 9.

Secured to the inner side of the lower portion of the panel 39 are one or more offset fingers 48 which extend back of and are adapted to engage offset fingers 49 carried by the outer surface of the lower strip 47.

The upper bed section 41 has a panel 50 connecting the ends thereof and, when the bed section is swung outwardly to active position as hereinafter explained, this panel 50 will constitute the bottom thereof.

Hingedly connected to the ends of the top bed section 41 are end panels 51 each of which may be provided with a screened window opening 52 having a hinged shutter 53. These end panels have cleats 54 hingedly connected to them and that end of each panel farthest removed from the end connected to bed section 41 is inclined as shown at 55. These end panels 51 are normally folded relative to the bed section 41 so that, when the two bed sections are disposed one above the other, the end panels will be positioned therebetween as shown in Figure 2.

As heretofore intimated, the trailer has its parts normally arranged to close the sides and the ends thereof, the panels 39, 35, and 29 being fitted against the adjacent lower fixed walls of the trailer so that dust and moisture will thus be excluded. The trailer can be drawn readily by an automobile to which the tongue 6 is attached and, in order that the driver may see traffic in the rear of the trailer, a window 56 can be provided in the front closure panel 25 in line with the window in the rear doors.

When it is desired to use the trailer the legs 21 can be lowered into contact with the ground and fastened by means of pins as heretofore explained. The automobile can then be disconnected from the tongue 6 so that the trailer will remain standing in a horizontal position. Thereafter the upper bed sections 41 are swung upwardly and outwardly. This will cause the panels 43 to thrust against the panels 39 to which they are connected and, after the parts pass the intermediate positions indicated by broken lines in Figure 2, they will ultimately assume the position shown in Figure 3. In other words, each of the bed sections 41 will swing outwardly and downwardly so as to extend laterally substantially flush with the inner bed sections 40.

The aprons 42 will swing against panels 43 to limit the relative movement of the parts and the end panels 51 can be swung upwardly to close the spaces between the ends of the panels 43 and 39 with the cleats 54 extending inwardly so as to lap the corner posts. Thus the panels 43 and 39 and the bed section 41 will be braced against relative movement and sagging. Thereafter mattresses and bedding which have been housed between the superposed or folded bed sections can be placed on the two extended sections.

It will be noted that when the section 41 is swung outwardly, the fingers 48 will pull outwardly on the fingers 49. This will cause the strips 47 to swing outwardly as shown by broken lines in Figure 2 and ultimately fold under the bottom panel 50 of each bed section 41. These folded strips will serve to reinforce the bed where it is connected to the top panel 18. Furthermore the folded strips will be supported above the paths of movement of the closures 15. Access can therefore be had readily to the cupboards 13 and 14.

After the parts have been set up as explained the shutters 45 and 53 can be opened or closed as desired. Furthermore the front closure section 29 and the rear closure section or panel 35 can also be opened if desired.

When it is desired to collapse the parts so as to permit the trailer to be transported, it merely becomes necessary to reverse the operation already described. The end panels 51 are swung downwardly onto the bed sections 41 after which said sections are swung upwardly and inwardly onto the sections 40 with the result that the panels 43 will be folded between the upper bed sections 41 and the panels 39.

If desired, a special mechanism may be employed for actuating the bed sections and the panels cooperating therewith. Each bed section 41 may be slidably and pivotally engaged by one end of a sweep 57 extending from a gear 58 journaled in the bed section 40. This gear meshes with a worm 59 carried by a short transverse shaft 60 located in one side of the trailer and journaled in the partitions 16 and 9. A removable crank arm 61 can be placed in engagement with either of the shafts and by means thereof the shaft can be rotated by a person standing in the aisle between partitions 16 to actuate gear 58 and cause sweep 57 to swing inwardly or outwardly to produce a corresponding movement of the bed section 40 and cause actuation of the panels controlled thereby.

The various joints between the panels and other parts can be so made as to prevent dust and moisture from entering the trailer.

If desired, and as shown in Figures 3 and 5 a longitudinal rod 62 can be mounted at its ends upon the end portions of the trailer at the centers thereof and this rod can support hooks 63 from which a curtain 64 may be suspended. This curtain can be used for dividing the trailer longitudinally into separate compartments.

What is claimed is:

1. A trailer including a wheel-supported structure, partitions therein dividing the bottom portion of the structure into a central aisle and opposed groups of compartments, superposed fixed and movable bed sections hingedly connected at their outer ends and disposed above the respective groups of compartments, side panels hingedly connected to and normally suspended from the top of the structure, connecting panels normally resting on the superposed bed sections and hingedly connected to the upper bed sections and to the side panels respectively, each upper bed section being movable outwardly and downwardly into position flush with the lower bed section to support the connecting panel in an upstanding position and the side panel in an outwardly and downwardly inclined position, and foldable reinforcing means connected to the bed sections, said means including hingedly connected strips, a hinge connection between one of the strips and the upper bed section and a hinge connection between the other strip and the lower bed section, said strips being movable to position between the bed sections and the side panels when the parts are in their normal positions.

2. A trailer including a wheel-supported structure, partitions therein dividing the bottom portion of the structure into a central aisle and opposed groups of compartments, superposed fixed and movable bed sections hingedly connected at their outer ends and disposed above the respective groups of compartments, side panels hingedly connected to and normally suspended from the top of the structure, connecting panels normally resting on the superposed bed sections and hingedly connected to the upper bed sections and to the side panels respectively, each upper bed section being movable outwardly and downwardly into position flush with the lower bed section to support the connecting panel in an upstanding position and the side panel in an outwardly and downwardly inclined position, and foldable reinforcing means connected to the bed sections, said means including hingedly connected strips, a hinge connection between one of the strips and the upper bed section and a hinge connection between the other strip and the lower bed section, said strips being movable to position between the bed sections and the side panels when the parts are in their normal positions, and cooperating means on one of the strips and on the side partitions for positively shifting the strips relative to each other when the movable bed section is swung outwardly and downwardly relative to the fixed bed section.

3. In a trailer the combination with a wheel-supported structure and superposed hingedly connected, fixed and movable bed sections carried by said structure, of a hinged side panel supported by said structure and adapted to close one side thereof and normally to lap and conceal the outer sides of the folded bed sections, a connecting panel hingedly attached to the upper movable bed section and to an intermediate portion of the first named panel, and an apron fixedly connected to one side of the movable bed section for concealing the inner sides of both bed sections when folded and for bearing outwardly against the connecting panel when the bed sections are unfolded, thereby to hold the panels and the movable bed section against sagging.

4. In a trailer the combination with a wheel-supported structure and superposed hingedly connected, fixed and movable bed sections carried thereby, of a hingedly mounted side panel supported by and adapted to close one side of said structure, a connecting panel hingedly attached to the upper movable bed section and to the side panel, and an apron carried by the movable bed section for concealing the inner sides of both sections when folded and for bearing outwardly against the connecting panel when the bed sections are unfolded, thereby to hold the movable bed section and the said connecting panels against sagging.

5. A trailer including a wheel-supported structure, superposed fixed and movable bed sections hingedly connected at their outer sides and normally resting one upon the other to form a side seat, a rigid side panel hingedly connected to and normally suspended from the top of the structure, a rigid connecting panel normally resting on the superposed bed sections to provide a seat top and hingedly connected to the upper bed section and to an intermediate portion of the side panel respectively, the upper bed section being movable outwardly and downwardly into position flush with the lower bed section to support the connecting panel in an upstanding position and the side panel in an outwardly and downwardly inclined position, that portion of the side panel below its point of attachment to the connecting panel constituting means for lapping and concealing the outer sides of the bed sections when folded.

6. In a trailer, the combination with a wheel-supported structure and superposed hingedly connected fixed and movable bed sections within said structure and, the movable section being normally inverted and flat upon the other section to form the bottom of a side seat, of a hingedly mounted side panel supported by said structure and adapted to bear against the connected sides of the folded sections to close one side of the body and form the back of the side seat, a connecting panel hingedly connected to and normally covering the upper movable bed section and hingedly connected to an intermediate portion of the first-named panel, said movable bed structure being adapted to swing laterally and downwardly relative to the fixed bed section to shift the panels to provide a roof extension and a side wall thereunder.

7. A trailer including a wheel-supported structure, superposed fixed and movable bed sections hingedly connected at their outer ends, the movable section being normally inverted and flat upon the other section to form the bottom of a side seat, side panels hingedly connected to and normally suspended from the top of the structure, connecting panels normally resting on the superposed bed sections to form side seat covers and hingedly connected to the upper bed sections and to the side panels respectively, each upper bed section being movable outwardly and downwardly into position flush with the lower bed section to support the connecting panel in an upstanding position and the side panel in an outwardly and downwardly inclined position.

8. A trailer including a bed section mounted to swing, and means operable from within the structure for swinging the bed section into and out of normal position, said means including a sweep pivotally connected to and movable transversely of the structure and slidably and pivotally connected to the movable bed section, an actuating shaft, and a gear connection between said shaft and the sweep and means within the structure for actuating the shaft.

In testimony that I claim the foregoing as my own, I have hereto affixed my signature.

JOHN CLELLAND FONTAINE.